United States Patent [19]
Denman et al.

[11] Patent Number: 5,417,786
[45] Date of Patent: May 23, 1995

[54] APPARATUS AND METHOD FOR COATING AND WRAPPING PIPE

[76] Inventors: George W. Denman, 17003 Costero, Houston, Tex. 77083; Samuel J. Homes, 10619 Del Monte, Houston, Tex. 77042; James L. Rose, P.O. Box 1600, Brookshire, Tex. 77423-1600

[21] Appl. No.: 44,800

[22] Filed: Apr. 12, 1993

[51] Int. Cl.$^6$ .......................................... B65H 81/08
[52] U.S. Cl. .................................. 156/187; 156/188; 156/195; 156/390; 156/392; 156/432; 156/577
[58] Field of Search ............... 156/187, 188, 195, 390, 156/392, 428, 430, 431, 432, 577

[56] References Cited
U.S. PATENT DOCUMENTS

| | | |
|---|---|---|
| 1,375,979 | 4/1921 | Taber . |
| 1,796,691 | 3/1931 | Jansen . |
| 1,821,352 | 9/1931 | McManis . |
| 1,883,401 | 10/1932 | Rolfs et al. ............ 156/428 X |
| 1,926,387 | 9/1933 | Jansen . |
| 2,044,778 | 6/1936 | Halstead . |
| 2,053,307 | 9/1936 | Wilson . |
| 2,302,196 | 11/1942 | Downs et al. . |
| 2,764,218 | 9/1956 | Richards, Jr. ............ 156/390 |
| 3,389,009 | 6/1968 | McNulty et al. ........... 156/392 X |
| 3,439,649 | 4/1969 | Probst et al. . |
| 3,994,766 | 11/1976 | Dedels . |
| 4,069,088 | 1/1978 | Cottam .................. 156/392 |
| 4,208,230 | 6/1980 | Magarian ................ 156/390 X |
| 4,482,420 | 11/1984 | Morimoto et al. .......... 156/392 |
| 4,707,214 | 11/1987 | Nithart et al. ........... 156/392 |
| 5,046,558 | 9/1991 | Koster ................ 156/392 X |
| 5,174,846 | 12/1992 | Bate et al. ............ 156/392 X |

FOREIGN PATENT DOCUMENTS
1928269 12/1970 Germany ................ 156/188

Primary Examiner—Mark A. Osele
Attorney, Agent, or Firm—Bush, Moseley, Riddle & Jackson

[57] ABSTRACT

A self propelled vehicle (14) has rollers (20, 22) supporting the vehicle for movement. A ring (44) is mounted for rotation and has rolls (54) of wrapping material (55) thereon for wrapping the pipeline (10). A plurality of discharge nozzles (82) spaced about the pipeline (10) forwardly of the rolls (54) of wrapping material (55) spray a liquid coating material in streams (86) impacting adjacent wrapped and unwrapped portions of the pipeline 10 as shown in FIG. 9. The wrapping material (55) is porous and the coating material permeates and saturates the wrapping material from both the inner and outer surfaces of the wrapping material (55). Fabric-type wipers (81) rearwardly of the rolls (54) of wrapping material (55) smooth and even the outer surface of the wrapping material and upon curing of the coating material, such as an epoxy resin, a hard outer protective liner or covering is formed including the wrapping material.

A separate embodiment in FIGS. 10-16 shows a stationary wrapping and coating machine (14A) for wrapping and coating separate pipe sections (10A) removably connected in end to end relation by a separate connector (13A) for moving through the machine (14A). An inner non-porous wrapping material (23A) is wrapped about the joint between the pipe sections (10A) before application of the wrapping and coating materials and is removed from the pipe sections (10A) after application of the wrapping and coating materials.

6 Claims, 6 Drawing Sheets

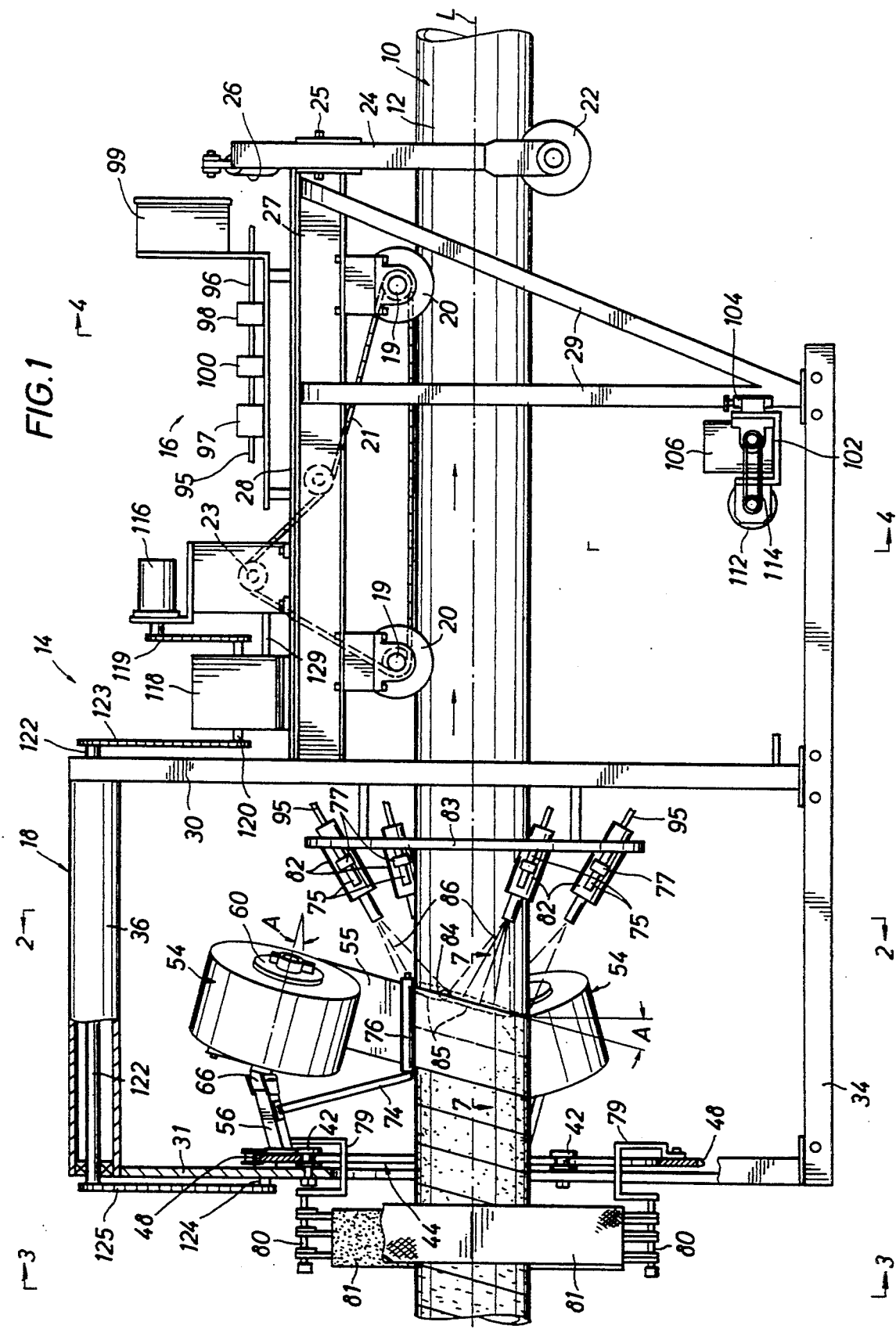

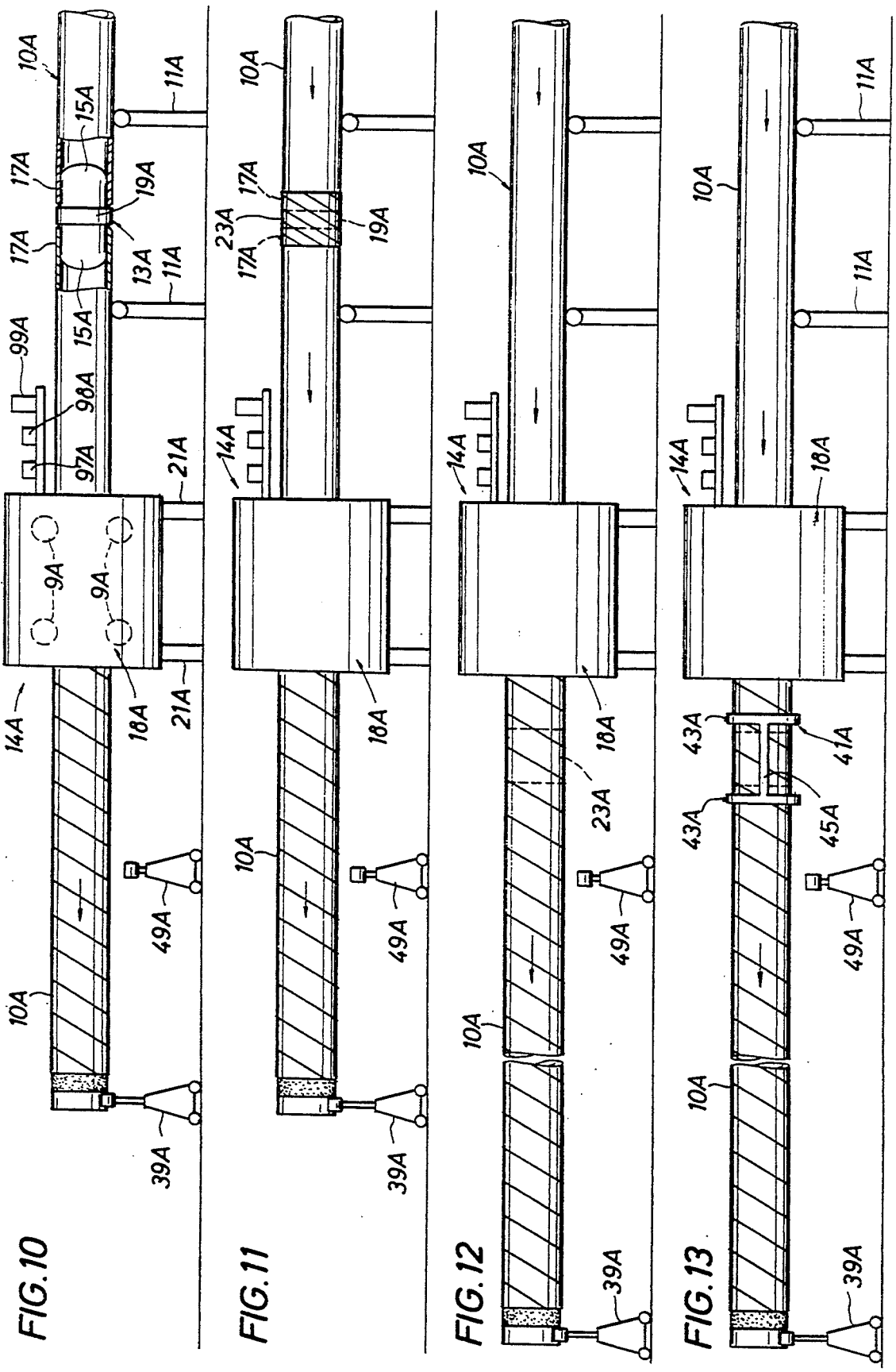

APPARATUS AND METHOD FOR COATING AND WRAPPING PIPE

FIELD OF THE INVENTION

This invention relates to an apparatus and method for coating and wrapping pipe, and more particularly to such an apparatus and method utilizing a self propelled vehicle supported on and travelling along a pipeline.

BACKGROUND OF THE INVENTION

Heretofore, such as shown in U.S. Pat. No. 3,994,766 dated Nov. 30, 1976, an apparatus has been provided for coating and wrapping a pipeline. Tape spools are mounted on rotating rings which rotate about the longitudinal axis of the pipeline for wrapping the pipe in a spiral path with a wrapping tape. A protective coating material comprising a priming or coating solution is sprayed onto the outer surface of the pipeline ahead of the wrapping tape after the pipe has been cleaned and before the tape is wrapped on the pipe. The tape does not absorb the coating solution and is not of a porous material to be saturated by the priming or coating solution. The primer or coating solution also tends to secure the wrapping tape to the outer surface of the pipeline. Excess coating liquid is collected in a container beneath the pipeline and recirculated. Brushes ahead of the wrapping material are utilized for cleaning the pipe prior to application of the coating material and a smoothing collar is utilized to smooth the coating material ahead of the wrapping material.

SUMMARY OF THE INVENTION

The present invention is particularly directed on an apparatus and method for wrapping a pipeline in which the pipeline is wrapped with a wrapping material that absorbs a coating material on the pipeline to form an outer liner or protective covering for the pipeline which consists of the combined coating material and saturated wrapping material. The wrapping material comprises a porous material formed for example of a material such as a polyester, material, or other suitable fibrous material. The coating material permeates the wrapping material to form an outer covering for the wrapping material thereby to protect and reinforce the wrapping material and form a hard outer liner on the pipeline.

A preferred material for the coating material is an epoxy resin material of two parts which harden when blended and cured. The epoxy resin when applied normally includes substantially equal amounts of two liquid reactants, one reactant being an epoxide and the other reactant being an acidic material such as diphenol or BPA (biphenol acetone). When cured, a hard polymer or epoxy resin material is formed to provide a strong, hard, outer liner incorporating the wrapping material therein.

To insure that the wrapping material is completely saturated with the coating material and form a covering over the wrapping material, spray nozzles for the coating material direct streams of liquid coating material against both wrapped and unwrapped portions of the pipeline with one portion of each stream impacting an unwrapped portion of the pipeline and the remainder of each impacting against adjacent wrapping material on the wrapped portion of the pipeline. A rotating wiper smooths the coating material and wrapping material after spraying of the coating material onto the pipeline.

It is an object of this invention to provide an apparatus and method for coating and wrapping a pipeline utilizing a self propelled vehicle supported on and travelling along a pipeline.

It is a further object of this invention to provide such an apparatus and method providing a hard outer protective covering or liner for the pipeline comprised of a porous wrapping material saturated with a coating material to form the hard outer liner.

Another object of this invention is to provide such an apparatus and method in which the coating comprises an epoxy material which permeates opposed sides of the porous wrapping material to form when cured a strong, hard outer liner about the pipeline.

Other objects, features, and advantages of the invention will become more apparent after referring to the following specification and drawings.

BRIEF DESCRIPTION OF THE DRAWINGS

FIG. 1 is a side elevation of the self propelled vehicle comprising the present invention mounted on a pipeline for wrapping and coating the pipeline;

FIG. 10 is an elevational view, partly schematic, of another embodiment of this invention in which the wrapping and coating apparatus is fixed and separate connected pipe sections are fed through the apparatus for the application of the wrapping and coating materials;

FIG. 11 is a view similar to FIG. 10 but showing the joint between adjacent pipe sections wrapped with a layer of non-porous material prior to entry within the wrapping and coating machine;

FIG. 12 is a view similar to FIG. 11 but showing the connected pipe sections after leaving the wrapping and coating machine;

FIG. 13 is a view similar to FIGS. 11-12 but showing a cutting tool for removing coating and wrapping materials from the connection between the pipe sections;

DESCRIPTION OF THE INVENTION

Figure 3:
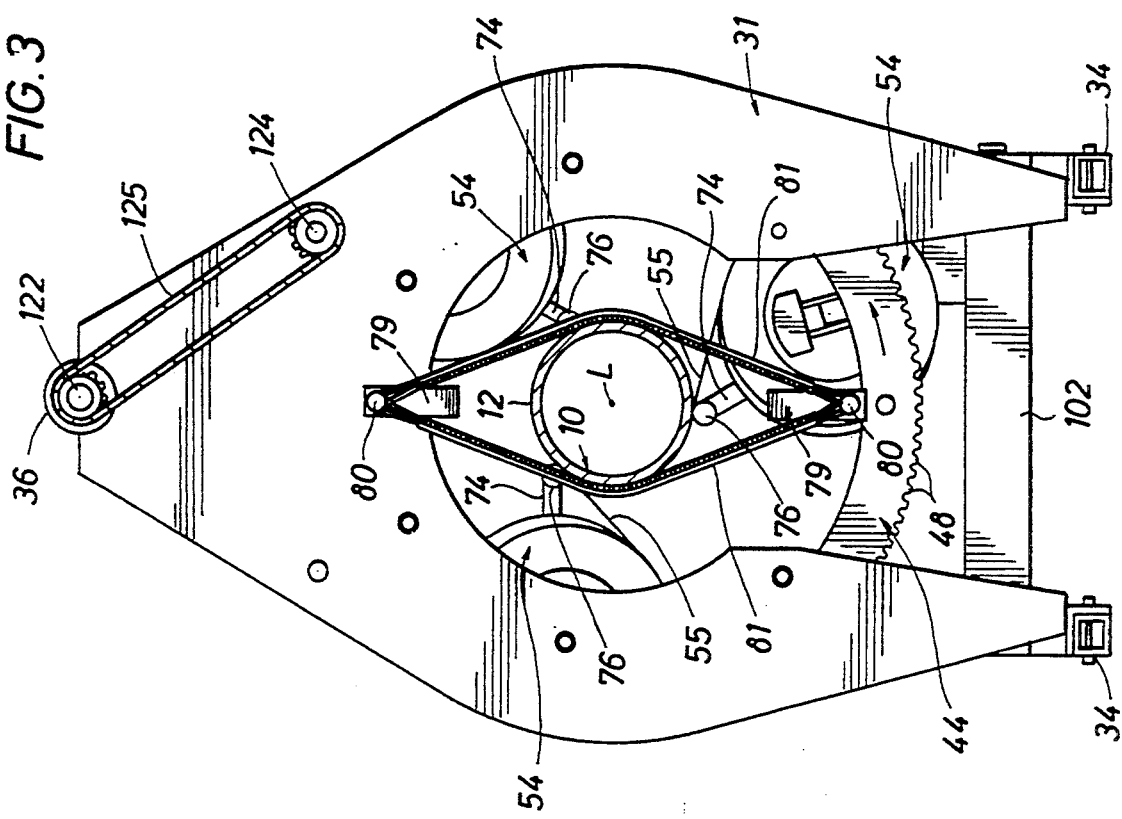
FIG. 3 is an end elevation looking generally along line 3—3 of FIG. 1 and showing particularly means to smooth the coating material and means to press the wrap material against the outer surface of the pipeline.

Referring now to the drawings for a better understanding of this invention and more particularly to FIG. 1, a pipeline is shown generally at 10 and the outer peripheral surface 12 of pipeline 10 has been cleaned beforehand with suitable coating removal and cleaning apparatus (not shown) as well known in the art. It is now desired to apply a protective covering to outer surface 12. For that purpose, a self propelled coating and wrapping vehicle or machine shown generally at 14 is supported on pipeline 10 for self propelled travel along pipeline 10 at a predetermined rate of travel. Vehicle 14 includes a front roller frame generally indicated at 16 and a rear cantilevered support frame 18 for supporting the coating and wrapping equipment for applying the coating material and wrapping material to pipeline 10.

Front roller frame 16 has upper rollers 20 supported on the upper surface of pipeline 10 and a pair of lower rollers 22 engaging the lower surface of pipeline 10. Upper rollers 20 are mounted on shafts 19 having a sprocket chain 21 connected thereto and driven by sprocket 23 from a hydraulic motor. Rollers 22 are mounted on arms 24 which are pivoted at 25 by hydraulic cylinders 26 for radial inward and outward movement relative to pipeline 10. Rollers 22 are pivoted outwardly for removal of vehicle 14 from pipeline 10 and pivoted inwardly for supporting engagement with pipeline 10 for positioning vehicle 14 onto pipeline 10. Lower rollers 22 also react the torque force generated by the weight of rear cantilevered frame 18. Front roller support frame 16 has a pair of upper longitudinally extending frame members 27 and a horizontal plate 28 extending between members 27 forms an upper supporting base for various members as will be described further hereinafter. Frame members 29 secured to frame members 27 extend downwardly alongside pipeline 10.

Rear frame 18 has a pair of inverted U-shaped frame members 30, 31 extending vertically for fitting alongside pipeline 10. Lower horizontally extending base frame members 34 extend between and are secured to the lower ends of frame members 29, 30, and 31. An upper horizontally extending tubular frame member 36 extends between the upper ends of U-shaped frame members 30, 31. Rear inverted U-shaped member 31 has a plurality of grooved rollers 42 thereon. Mounted for rotation on rollers 42 is a ring 44 having outer teeth 48 and formed of detachable arcuate sections 50 for fitting about pipeline 10. Arcuate sections 50 are bolted to each other through lugs 52 integral with the arcuate sections 50. The front face of ring 44 has mounting means thereon for wrapping rolls generally indicated at 54 of wrapping material 55 and spaced at arcuate intervals of 120° about ring 44. A frusto-conical housing or shroud may, if desired, be secured to ring 31 to extend over rollers 42 to protect rollers 42 from foreign material, such as the coating material.

Figure 6:
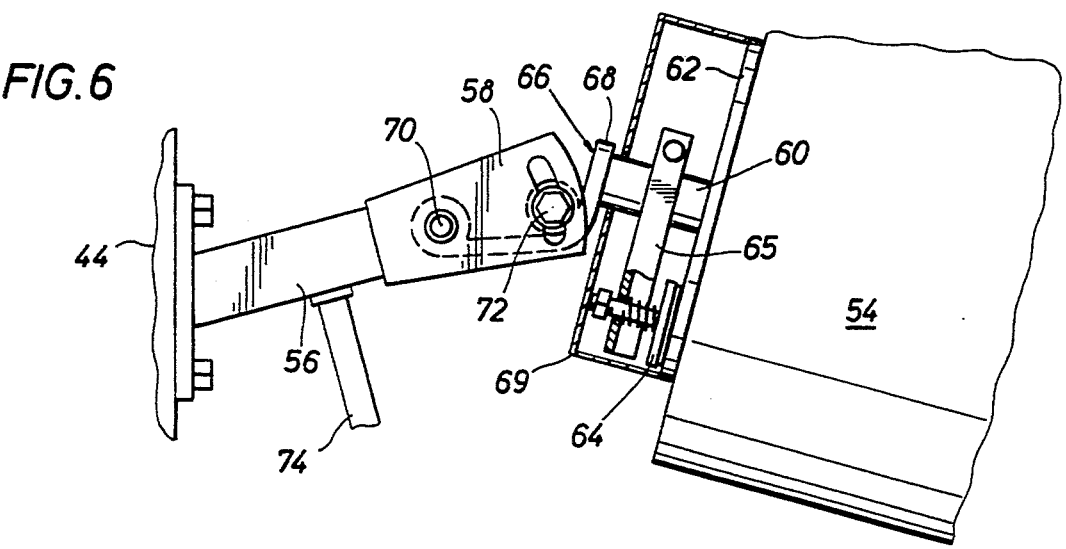
FIG. 6 is a perspective of the means mounting a wrapping roll on a rotating ring for unwrapping of the wrapping material.

As shown particularly in FIG. 6, the mounting for each roll 54 includes an extension 56 extending from ring 44 and having a mounting bracket 58 on its extending end. An inner cylinder or rotatable drum for roll 54 is mounted for rotation about shaft 60 and has a drum plate 62 on which a brake shoe 64 mounted on an end of arm 65 on shaft 60 applies a uniform force for controlling the unwrapping of the wrapping material 55 from the drum during wrapping of pipeline 10. A mounting arm 66 has one end 68 connected to shaft 60 for the drum and an opposite end of arm 66 is pivotally mounted at 70 which may be connected to a manually operated plunger, if desired. Arm 66 is mounted for pivotal adjusting movement at 72 on bracket 66 to adjust the longitudinal axis of shaft 60 relative to the longitudinal axis of pipeline 10 to determine the angularity of the helical or spiral wrap about pipeline 10 as indicated by angle A shown in FIG. 1. Roll 54 including shaft 60 and mounting arm 66 are mounted for removal from bracket 58 upon removal of pivot 70 and adjusting bolt 72. To protect drum plate 62 and brake shoe 64 from foreign matter such as the Coating material, a housing shown partially at 69 is secured to drum plate 62. As shown also in FIGS. 2 and 3, an inwardly extending support member 74 is secured to and extends inwardly from each arm 56 toward the outer surface of pipeline 10. Support member 74 has a roller 76 mounted for rotation on a shaft extending horizontally from the free end of support member 74. Roller 76 contacts and rides against the outer surface of the wrapping material 55 as it is unwound from the associated roll 54 and presses the wrapping material 55 against the outer surface of pipeline 10 particularly at the seams of overlapping layers.

Secured to and extending from the rear face of ring 44 are a pair of opposed brackets 79 which are shaped to fit about end frame member 31. Opposed mounting pins or bars 80 extend from the ends of brackets 79 in a direction parallel to the longitudinal axis of pipeline 10. A pair of fabric type wiping and smoothing members 81 are mounted on pins 80 for contacting opposite sides of pipeline 10. Upon rotation of ring 44, smoothing members 81 ride along the outer surface of the wrapping material 55 and coating material thereon to smooth and even the coating material on the saturated wrapping material prior to curing or drying of the coating material. Other suitable smoothing members, such as rollers or brushes, could be substituted if desired for smoothing members 81 and would function in a satisfactory manner for contacting wrapping material 55 and distributing the coating material thereon.

Figure 7:
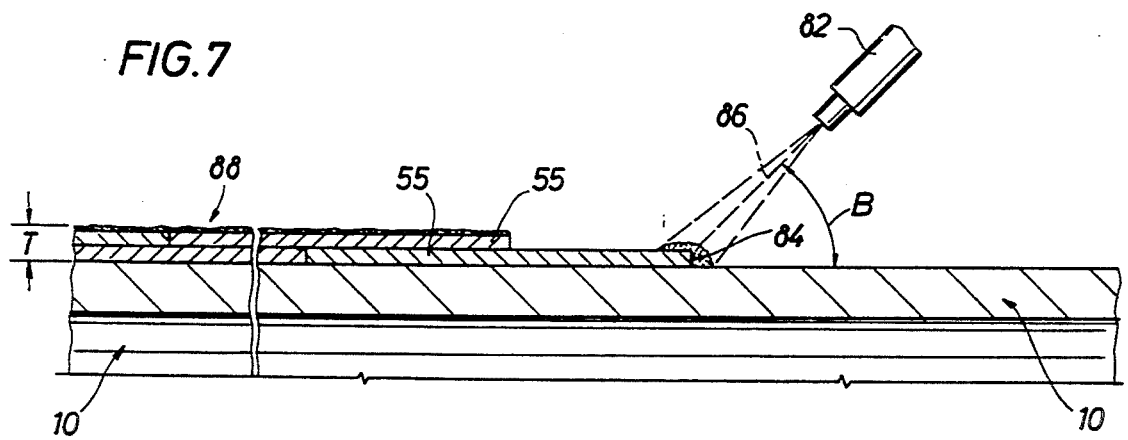
FIG. 7 is an enlarged section taken generally along line 7—7 of FIG. 1 and showing the lining material on the outer surface of the pipeline.

For simultaneously applying the liquid coating material onto the outer surface of wrapping material 55 and the adjacent unwrapped portion of pipeline 10, four spray heads or nozzles 82 are adjustably mounted on a ring 83 secured to U-shaped frame member 30 at arcuate intervals of around 90° about the outer periphery of pipeline 10 for directing a stream of coating material against pipeline 10. Mounting pins 75 are secured to fixed ring 83 and mounting brackets 77 are mounted on pins 75 for adjustment along pins 75. Spray heads 82 are secured to brackets 77 and may be adjusted longitudinally on pins 75 with brackets 77. The longitudinal axes of nozzles 82 are at an angle B of around 45 degrees as shown in FIG. 7 relative to the longitudinal axis L of pipeline 10 for directing the stream 86 of coating material against the exposed edges of the wrapping material and against adjacent wrapped and unwrapped portions of the pipeline for a width of between one (1) to four (4) inches as shown particularly in FIGS. 1 and 7. The wrapping material 55 is formed of a suitable porous material, for example, such as a polyester or other suitable fibrous material, for example. The liquid coating material permeates the porous wrapping material from both sides to saturate wrapping material 55 throughout its entire thickness. While two layers of wrapping material are shown, pipeline 10 may be wrapped with a predetermined number of layers of wrapping material to provide the desired thickness for the outer liner. Each nozzle 82 directed toward pipeline 10 at an angle of 45° has an elongate orifice with the center of the volume of the coating stream 86 as shown particularly in FIG. 7 being directed against the exposed edge 84 of a lower layer of wrapping material 55. Wrapping material 55 is wrapped in two layers about the outer surface of pipeline 10 and has a width of around twelve (12) inches thereby to provide an overlap of around six (6) inches. Edge 84 is at an angle A of around 15° relative to the transverse axis of pipeline 10 as shown in FIG. 1 as determined by the inclination of roll 54. Likewise the rotational axis of wrapping rolls 60 is at an angle A of around 15° relative to the transverse axis of pipeline 10. Nozzle 82 may be mounted around eighteen (18) inches from the outer surface 12 of pipeline 10. The spray pattern of the coating stream from each orifice comprises a generally arcuate band 85 as shown in FIG. 1 of between around one (1) to four (4) inches in thickness or width and of a length to cover around 95° of the periphery of pipeline 10 thereby to provide a slight overlapping of the ends of the spray patterns from adjacent nozzles 82. Rollers 76 and wipers 81 distribute and spread the coating material evenly throughout the two porous layers of wrapping material for subsequent curing of the coating material. Rollers 76 following the application of the coating material press the coating material and layers of wrapping material 55 against the outer surface of pipeline 10 while evening the coating material thereon. Wipers 81 further smooth and even the coating material and saturated layers of wrapping material thereby to provide a generally uniform thickness and uniform distribution of coating material for the completed outer liner 88 upon curing and drying of the coating material as shown in FIG. 7.

While the coating material may be of various materials, a preferred coating material is an epoxy resin material. A typical epoxy material is formed from substantially equal amounts of two reactants, one reactant being the epoxide and the other reactant being an acidic material such as a diphenol or BPA (biphenol acetone). When cured, a hard polymer or thermosetting resin is formed to provide a strong, hard outer liner 88 as shown in FIG. 7. Rotating rollers 76 and rotating fabric-type smoothing members or wipers 81 press and rub against the outer surface of wrapping material 55 after saturated with the coating material to even and smooth the coating material and wrapping material for providing a generally uniform thickness for the protective covering or liner on pipeline 10 after drying or curing of the coating material and the saturated wrapping material. Wrapping material 55 may, for example, have a thickness of around 0.050 inch and the thickness T of the cured finished protective liner 88 on pipeline 10 may be, for example, around 0.15 inch. A thickness T of between around 0.050 inch and 0.30 inch for liner 88 is believed to be satisfactory dependent on factors such as pipeline size, the location of the pipeline, the desired life of the liner and the type of epoxy. The spiral or helical wrap may be at a leading angle of around 15° from the transverse axis of pipeline 10 as determined by the angularity of wrapping roll 54. Referring to FIG. 7 which is taken along line 7—7 of FIG. 1, nozzle 82 is shown directing a stream 86 of epoxy resin coating material against edge 84. The stream 86 as indicated above has a width of around one (1) to two (2) inches, for example, directed against an unwrapped portion of exterior surface 12 of pipeline 10 in addition to the adjacent wrapped portion along around 95° of the arcuate outer periphery of pipeline 10. Two separate layers of the porous wrapping material 55 are shown.

Figure 8:
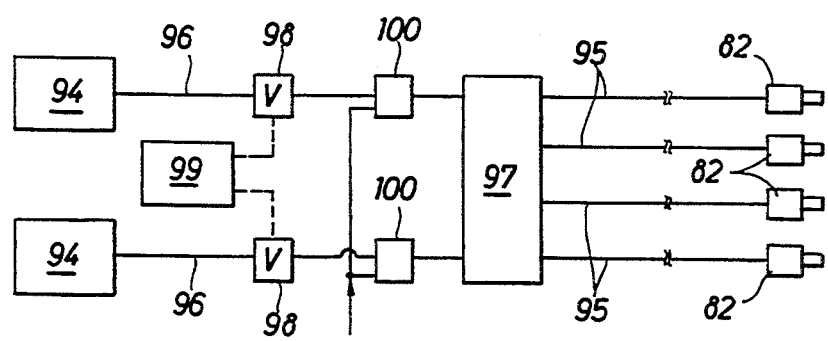
FIG. 8 is a schematic of the system for application of the epoxy resin against the pipeline.

When utilizing an epoxy for the coating material as shown schematically in FIG. 8, a supply of the two reactants is shown at 94 which may be mounted on a skid or the like adjacent the wrapping and coating vehicle 14 and supplied through lines 96 to a mixing head 97 where the reactants are mixed and discharged through separate lines 95 to nozzles 82 for discharge against pipeline 10. The two reactants are separated prior to blending at mixing head 97 and suitable electronically controlled valves 98 control the supply of the reactants to mixing head 97. Electronic controls for control panel 99 determine the amount of the two reactants supplied to mixing head 97 which may be varied as desired. After the coating operation, it is necessary to clean nozzles 82 and suitable purge valves 100 supplied with a suitable solvent clean mixing head 97, lines 95 and nozzles 82. The epoxy material may be heated to a desired temperature such as around 150° F. for application. It is understood that other suitable coating materials may be provided although a two component coating material is preferred. For example, a two component polyurethane coating may be utilized satisfactorily.

Figure 4:
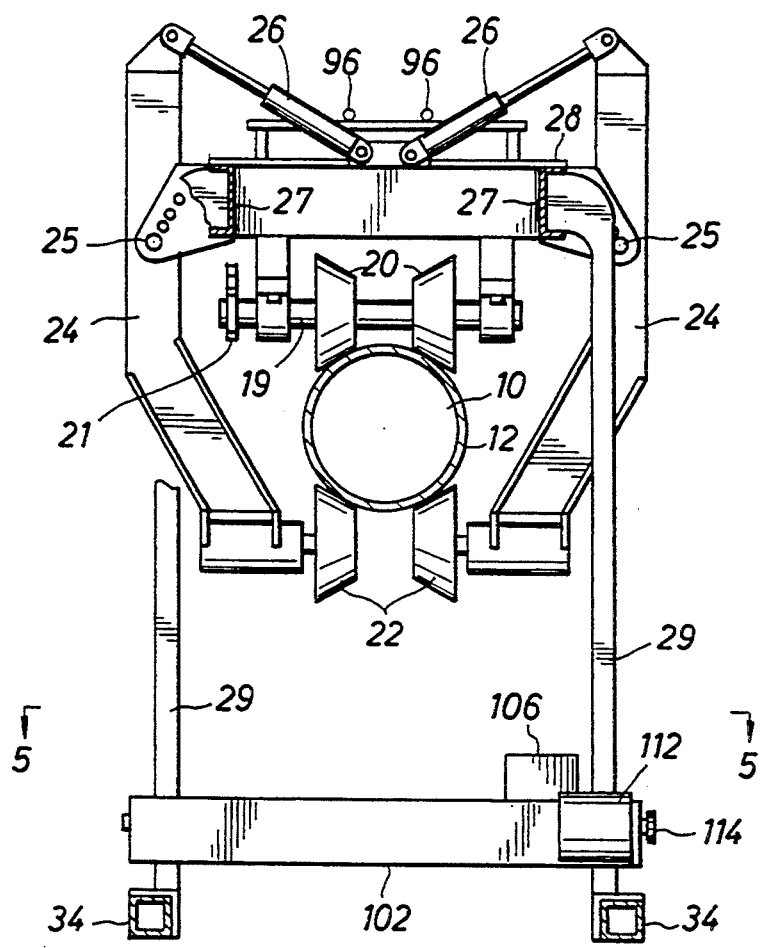
FIG. 4 is a section taken generally along line 4—4 of FIG. 1 and showing means for mounting the self propelled vehicle on the pipeline for travel.
Figure 5:
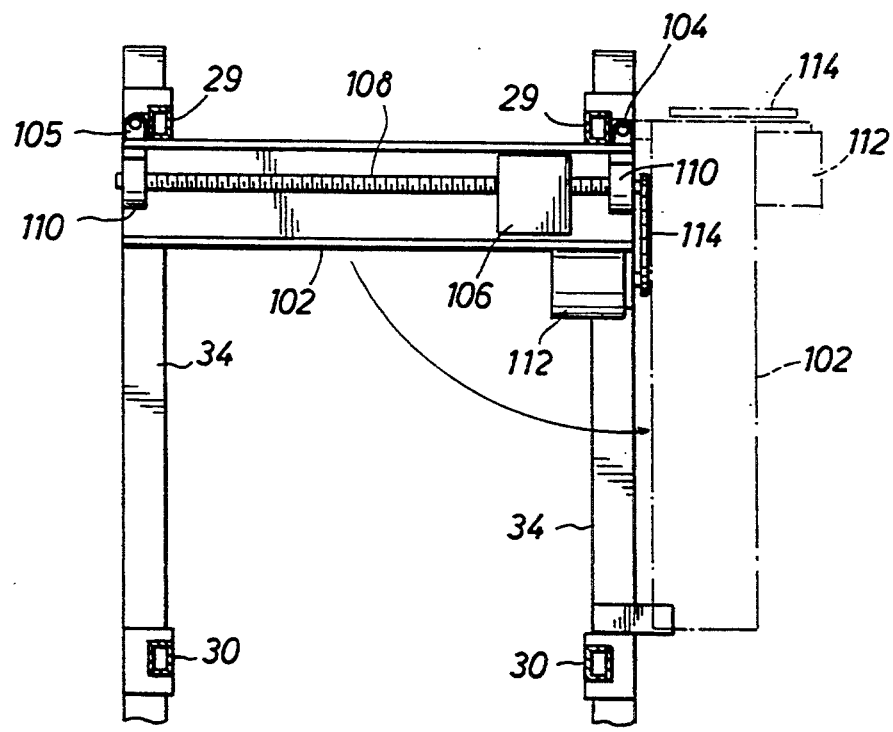
FIG. 5 is a top plan of the counterbalance for the centrifugal forces looking generally along line 5—5 of FIG. 4.

Referring to FIGS. 4 and 5, a counterbalance for the centrifugal force generated by rotation of ring 44 and wrapping rolls 52 is shown. A U-shaped support beam 102 is supported on base frame members 34 for pivotal movement about pivot 104 to the broken line position thereof shown in FIG. 5 to permit the coating vehicle 14 to be lowered onto and lifted from pipeline 10. Extension 105 on beam 102 is releasably connected to horizontal frame member 29 for maintaining beam 102 in secured position. Mounted on support beam 102 is a counterweight 106 threaded onto an externally threaded drive rod 108 mounted for rotation on suitable bearings 110. A hydraulic motor 112 rotates drive rod 108 through drive sprocket chain 114 for moving counterweight 106 to the desired location which may be controlled from control panel 99.

Figure 2:
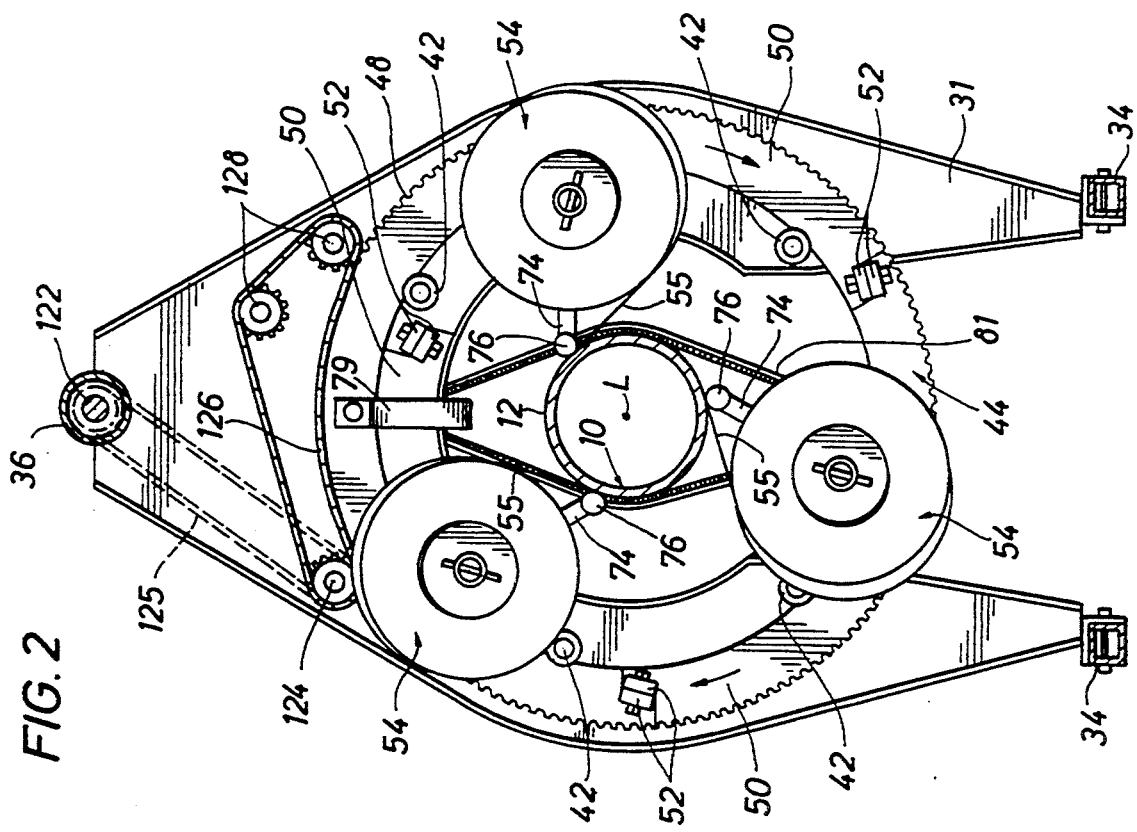
FIG. 2 is a section taken generally along line 2—2 of FIG. 1 and showing the wrapping rolls for wrapping the pipe.
Figure 9:
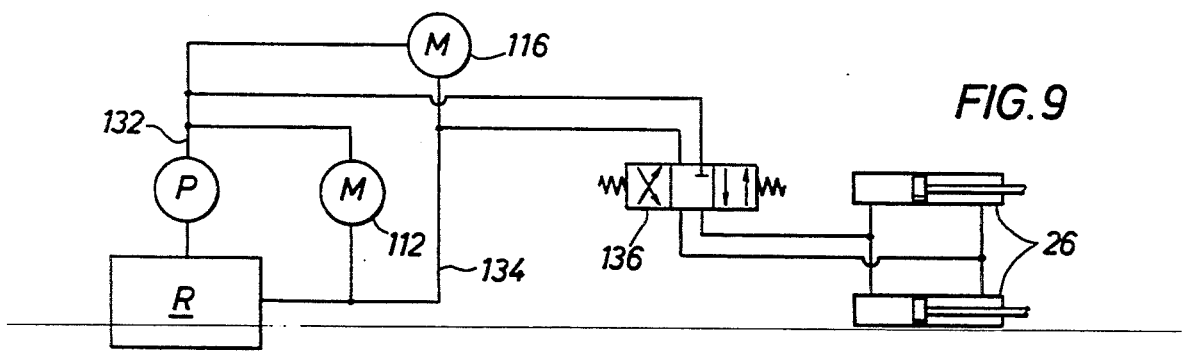
FIG. 9 is a schematic of the hydraulic fluid system for operation of the self propelled vehicle.
Figure 14:
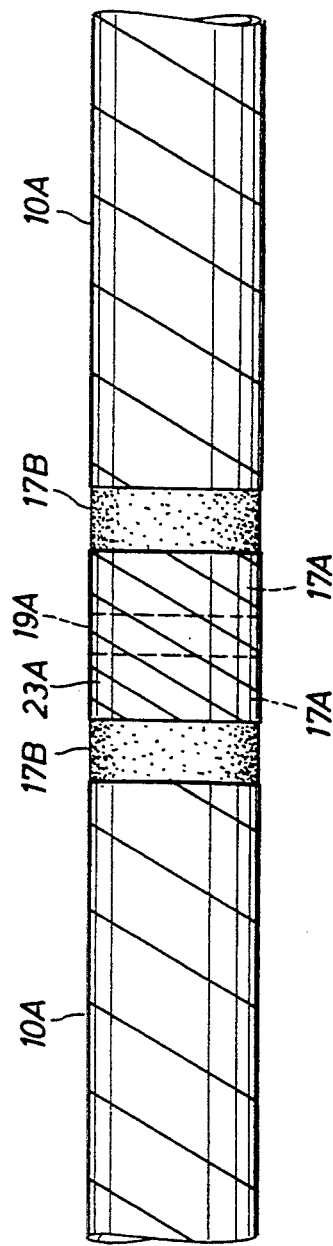
FIG. 14 is an enlarged view of the connection between adjacent pipe sections after the porous wrapping material is removed.
Figure 15:
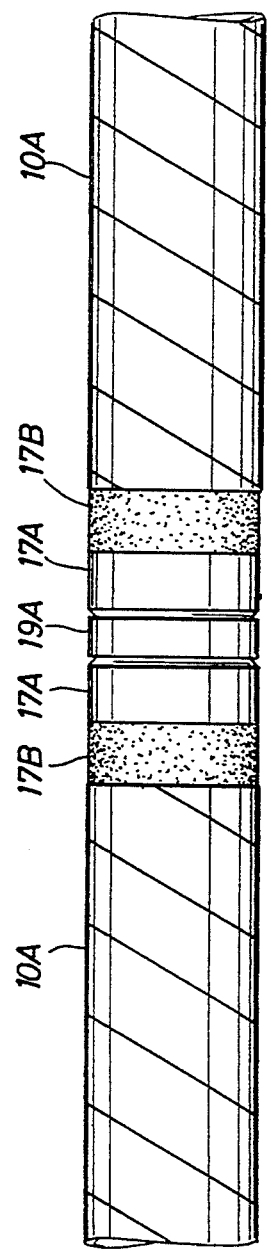
FIG. 15 is an enlarged view similar to FIG. 14 but showing the connection after removal of the non-porous layer of wrapping material covering the joint.

For rotating ring 44 and driving upper rollers 20 as shown in FIG. 1 and 9, a hydraulic motor 116 drives a gear reducer 118 from sprocket chain 119. Gear reducer 118 has an output shaft 120 connected to drive shaft 122 through sprocket chain 123 and mounted within tubular member 36 for rotating countershaft 124 through sprocket chain 125. As shown in FIG. 2, a drive sprocket chain 126 extending over idler sprockets 128 engages an upper arcuate portion of the teeth 48 in toothed ring 44 for rotating ring 44 along with wrapping rolls 54, rollers 76, and wipers 81. The rotation of ring 44 with wrapping rolls 54 thereon produces a centrifugal force acting against vehicle 14 and counterweight 106 may be adjusted to maintain vehicle 14 in a centered position on pipeline 10. Output shaft 129 from gear box 118 drives shaft 23 for rotating drive rollers 20 from sprocket chain 21.

Referring to FIG. 9, a schematic of the hydraulic fluid system is illustrated including a reservoir R and pump P which may be mounted on a separate support skid or the like moving alongside pipeline 10. Fluid is supplied from pump P to fluid motors 112 and 116 from supply line 132 and returned to reservoir R through return line 134. A three way valve 136 is provided by hydraulic cylinders 26 to control the pivoting of lower rollers 22. Suitable hydraulic controls are provided for the operation of motors 112, 116 and actuation of cylinders 26.

Vehicle 14 normally travels along pipeline 10 at a rate of travel between around six (6) and twelve (12) feet per minute. After application of the epoxy coating material, the curing or hardening of the epoxy liner normally is accomplished in around four (4) to seventy two (72) hours dependent primarily on the ambient temperature. If the ambient temperature is around 100° F. or above only around four (4) to eight (8) hours will be required for curing.

The present coating apparatus may be utilized with minor modifications at a fixed installation to coat separate pipe sections fed through the fixed coating apparatus. The modified coating apparatus is shown in FIGS. 10-16 largely diagrammatically. Coating and unwrapping machine 14A is generally similar to coating and wrapping machine 14 but does not include any rollers supporting the machine on the pipe. A frame or housing 18A has vertical supports 21A for supporting housing 18A on a supporting surface such as the ground or a concrete foundation, for example. An epoxy may be utilized for the coating material as in FIGS. 1-9. Also, a two component polyurethane coating may be utilized with the two reactants supplied through separate lines to mixing head 97A with the blend controlled by suitable electronically controlled valves 98A from a control panel 99A. The mixed reactants are supplied to suitable nozzles for application of the coating material as in the embodiment shown in FIGS. 1-9.

Polyurethane is a thermoplastic polymer produced by the condensation reaction of a polyisocyanate and a hydroxyl-containing material such as a polyol derived from propylene oxide or trichlorobutylene oxide. When used specifically as a coating, a two component formulation is utilized including the thermoplastic polymer comprised of a two component formulation formed from prepolymers containing isocyanate groups (toluene and 4,4'-diphenylmethane diisocyanates) and hydroxyl-containing materials such as polyols and drying oils. Such a two component polyurethane coating may also be utilized in the embodiment of FIGS. 1-9.

To apply the coating to separate pipe sections 10A, a plurality of fixed roller supports 11A are provided to support the pipe sections 10A. Upper and lower pipe support rollers 9A are provided within housing 18A to feed the pipe therethrough. One upper roller 9A and lower roller 9A may be driven if desired to provide a uniform travel of pipe section 10A through the, coating machine 18A. Also, some of the rollers on roller supports 11A may be powered to assist in feeding the pipe sections 10A though the fixed wrapping and coating machine 14A.

First, as shown in FIG. 11 two adjacent pipe sections 10A prior to being moved or fed within coating apparatus 14A are removably connected to each other while supported on roller supports 11A by a connector generally indicated at 13A. Connector 13A includes a pair of opposed end guides 15A received in a close fitting relation within opposed bare end portions 17A of the adjacent pipe sections 10A. Connector 13A includes a central divider or separator 19A spacing adjacent ends of pipe sections 10A from each other. Next, as shown in FIG. 12 the connection between pipe sections 10A is wrapped manually with a non-porous layer 23A, such as brown paper, to cover connector 13A and end portions 17A for a length of around three (3) inches on each adjacent pipe section 10A. Divider 19A may have a width of two (2) inches. Thus, layer 23A may have a width of eight (8) inches to cover divider 19A and the adjacent end portions 17A of pipe sections 10A. After the joint or connection between pipe sections 10A is wrapped, the leading pipe section is then moved through coating apparatus 14A for application of the porous wrapping material and coating material over pipe sections 10A and non-porous layer 23A in a manner similar to the wrapping and coating apparatus of FIGS. 1-9.

Figure 16:
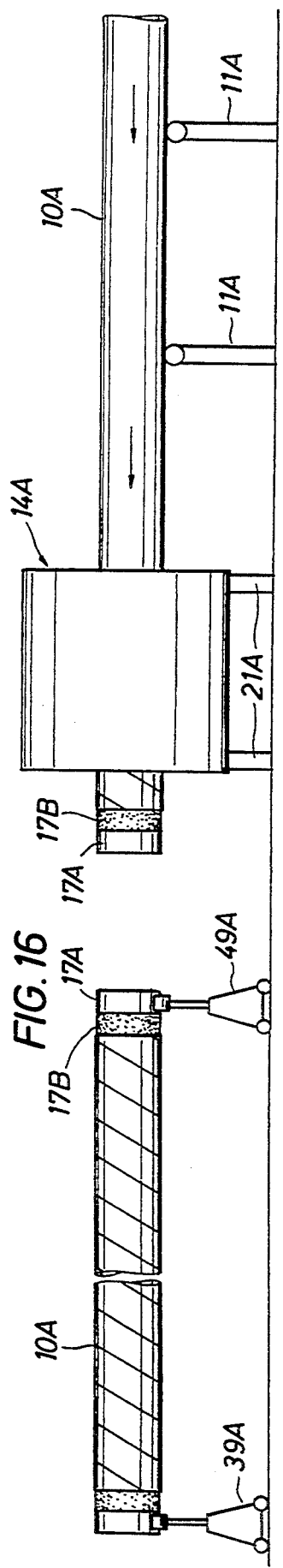
FIG. 16 is a view similar to FIGS. 11–13 but showing a leading pipe section being transported to a separate area for curing after removal from a trailing pipe section.

As shown schematically in the drawings, a leading dolly shown generally at 39A supports the leading end of pipe section 10A as it exits coating apparatus 14A after being separated from the adjacent pipe section 10A and moves the supported pipe section to the position shown in FIG. 12 in which the joint between pipe sections 10A has been coated and removed from apparatus 14A. A cutting template shown generally at 41A fits about opposed end portions 17A of adjacent pipe sections 10A as shown in FIG. 13. Template 41A has spaced cutting blades 43A thereon and a bar 45A may be manually gripped to rotate template 41A about adjacent pipe sections 10A for removing selected portions of the wrapping material. Blades 43A of template 41A are spaced a predetermined distance from each other such as fourteen (14) inches, for example, so that a six (6) inch portion of the outer porous wrapping material is removed from the end of each pipe section 10A and a two (2) inch portion is removed over divider 19. Upon removal of the porous wrapping material, a layer of coating material remains over the superjacent pipe surfaces and the layer 23A of brown paper. Next, layer 23A of brown paper along with the coating material on layer 23A is removed from end portions 17A and connector 19A thereby leaving a bare three (3) inch end portion 17A at the end of each pipe section 10A for subsequent welding when pipe sections 10A are connected in a pipeline, for example. Thus, a coated end portion 17B without any wrapping material is provided and an uncoated end portion 17A is provided for each pipe section 10A. A trailing dolly 49A is then raised to support the leading pipe section 10A at bare end portion 17A as shown in FIG. 16 and leading pipe section 10A is then separated from trailing pipe section 10A to remove connector 13A. Leading pipe section 10A is then moved to a curing area for curing of the coating material. Leading dolly 39A may be returned to support the leading end of the previously trailing pipe section 10A for beginning another cycle.

After curing the coating material, pipe sections 10A may be transported to desired sites for forming a pipeline or the like. Bare end portions 17A of opposed pipe sections 10A are welded to each other and thereafter a porous wrapping material and suitable coating material are applied either manually or automatically to the welded joint to form a smooth continuation of the coating previously applied to the pipe sections 10A.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. Apparatus for coating and wrapping a pipeline with an outer wrapping material to form an exterior lining for the pipeline; said apparatus comprising:
   a self propelled vehicle having a frame and rollers thereon for contacting and supporting said vehicle on said pipeline for movement along the pipeline;
   a ring supported for rotation on said frame;
   a plurality of rolls of wrapping material mounted on one side of said ring and extending over the pipeline, each roll having a wrapping material thereon for being wrapped about said pipeline and mounted for rotation about a longitudinal axis at a predetermined angle relative to the longitudinal axis of said pipeline;
   means to rotate said ring and rolls thereon about the longitudinal axis of said pipeline for wrapping said pipeline with the wrapping material in a generally spiral path;
   means to spray a coating on said pipeline forwardly of said wrapping material for securing said wrapping material about said pipeline and protecting the outer surface of the pipeline; and
   smoothing means on said vehicle rearwardly of said wrapping rolls for contacting the outer surface of said wrapping material on said pipeline for smoothing said wrapping material and said protective coating to provide a generally uniform thickness for said exterior lining; said smoothing means comprising a pair of opposed fabric-type wiper members in contact with opposite sides of said pipeline for smoothing said wrapping material and said coating.

2. Apparatus as set forth in claim 1 wherein a plurality of discharge nozzles for the coating material are positioned at arcuate intervals about the outer surface of said pipeline for directing streams of coating material against the pipeline with one portion of the streams impacting against an unwrapped portion of the pipeline and another portion of the streams simultaneously impacting a contiguous wrapped portion of the pipeline and the wrapping material adjacent said unwrapped portion.

3. Apparatus for coating and wrapping a pipeline with an outer wrapping material to form an exterior lining for the pipeline; said apparatus comprising:
   a self propelled vehicle having a frame and rollers thereon for contacting and supporting said vehicle on said pipeline for movement along the pipeline;
   a ring supported for rotation on said frame;
   a plurality of rolls of wrapping material mounted on one side of said ring and extending over the pipeline, each roll having a wrapping material thereon for being wrapped about said pipeline and mounted for rotation about a longitudinal axis at a predetermined angle relative to the longitudinal axis of said pipeline;
   means to rotate said ring and rolls thereon about the longitudinal axis of said pipeline for wrapping said pipeline with the wrapping material in a generally spiral path, the rotation of said ring and rolls generating a centrifugal force tending to move said vehicle in a transverse direction relative to the travel of said vehicle along said pipeline;
   means to spray a coating on said pipeline forwardly of said wrapping material for securing said wrapping material about said pipeline and protecting the outer surface of the pipeline; and
   adjustable counterbalance means on said vehicle to counterbalance the centrifugal force generated by rotation of said ring and wrapping rolls thereon about the longitudinal axis of said pipeline to assist in guidance of said vehicle along said pipe.

4. Apparatus for coating and wrapping a pipeline as set forth in claim 3 wherein said counterbalance means comprises a weight adjustable in a direction transverse to the longitudinal axis of said pipeline, and means to move said weight to a predetermined position in a direction transverse to the longitudinal axis of said pipeline.

5. A method for applying an outer protective covering on the outer surface of a pipeline by a self propelled vehicle having coating and wrapping equipment thereon and travelling along the pipeline; said method comprising the following steps:
   mounting a roll of wrapping material on a supporting ring mounted for rotation about the longitudinal axis of said pipeline;
   rotating said ring and roll about the longitudinal axis of said pipeline whereby a centrifugal force is generated upon rotation of said ring and roll of wrapping material tending to move said vehicle in a transverse direction;
   providing an adjustable counterbalance on said vehicle for counterbalancing the centrifugal force generated by said rotating ring to assist in guidance of said vehicle along said pipeline; and
   spraying a liquid coating material on the pipeline ahead of the wrapping material so that the coating material and wrapping material form an outer protective covering for the pipeline upon drying of the coating material.

6. The method of claim 5 including the step of:
   providing an adjustable weight on said vehicle movable in a direction transverse to the longitudinal axis of said pipeline; and
   moving said weight in a transverse direction to a desired location.

* * * * *